US011964369B2

(12) United States Patent
Tebo

(10) Patent No.: US 11,964,369 B2
(45) Date of Patent: Apr. 23, 2024

(54) SCREW MAGAZINE AND COLLATING SCREWS

(71) Applicant: Glenn J. Tebo, Kingston, NH (US)

(72) Inventor: Glenn J. Tebo, Kingston, NH (US)

( * ) Notice: Subject to any disclaimer, the term of this patent is extended or adjusted under 35 U.S.C. 154(b) by 0 days.

(21) Appl. No.: 18/323,150

(22) Filed: May 24, 2023

(65) Prior Publication Data

US 2023/0311281 A1 Oct. 5, 2023

Related U.S. Application Data

(63) Continuation of application No. PCT/US2021/072977, filed on Dec. 17, 2021.

(60) Provisional application No. 63/127,546, filed on Dec. 18, 2020.

(51) Int. Cl.
*B25B 23/04* (2006.01)
*B25B 23/10* (2006.01)

(52) U.S. Cl.
CPC ............ *B25B 23/045* (2013.01); *B25B 23/10* (2013.01)

(58) Field of Classification Search
CPC ......... B25B 23/00; B25B 23/02; B25B 23/04; B25B 23/045; B25B 23/06; B25B 23/065; B25B 23/08; B25B 23/10; B23P 19/006; B23P 19/06; F16B 15/00; F16B 15/08; F16B 25/00; F16B 25/0031; F16B 25/10; F16B 27/00
See application file for complete search history.

(56) References Cited

U.S. PATENT DOCUMENTS

| | | | | |
|---|---|---|---|---|
| 3,930,297 | A * | 1/1976 | Potucek | B25C 1/003 29/812.5 |
| 5,101,697 | A | 4/1992 | Fishback | |
| 5,303,620 | A * | 4/1994 | Payne | B25B 23/045 206/347 |
| 6,974,030 | B1 | 12/2005 | Sundstroem | |
| 2004/0006860 | A1 * | 1/2004 | Haytayan | F16B 25/0031 29/525.01 |
| 2007/0207011 | A1 | 9/2007 | Kim | |
| 2008/0290129 | A1 * | 11/2008 | Schell | B25C 5/1665 227/129 |

OTHER PUBLICATIONS

International Search Report and Written Opinion from corresponding PCT Appln. No. PCT/US21/72977, dated Apr. 11. 2022.

* cited by examiner

*Primary Examiner* — Robert J Scruggs
(74) *Attorney, Agent, or Firm* — Grossman, Tucker, Perreault & Pfleger, PLLC.

(57) ABSTRACT

A screw magazine having a loading end for receiving a collated strip of screws. The magazine includes a pusher that urges screws of a collated strip toward a discharge end of the magazine. A bit opening at a top and at the discharge end of the magazine is configured to receive a drive bit for driving the at least one screw through a discharge opening at a bottom of the magazine body. Also provided is a collated scrip of screws including a plurality of screws coupled to a rigid support configured to be held in a hand of a single user to allow driving of the screws with the other hand.

23 Claims, 11 Drawing Sheets

SCREW MAGAZINE AND COLLATING SCREWS

CROSS-REFERENCE TO RELATED APPLICATIONS

This application is a Continuation of PCT/US21/72977, filed Dec. 17, 2021, and claims the benefit of U.S. Provisional Patent Application No. 63/127,546, filed Dec. 18, 2020, the entire teachings both of which are hereby incorporated herein by reference.

FIELD

The present disclosure relates to fasteners, and, more particularly, to a screw magazine and collating screws.

BACKGROUND

A wide variety of fastener configurations for securing structural members to other members are known. In one example, a screw may be used for securing decking members to associated joists in the construction of an exterior deck, or the like. The screw may be driven into decking members using, e.g., a hand-held or a power fastening tool such as a power drill/driver. When driving screws into decking members, it can be cumbersome to handle each screw individually, orient the screw with respect to the decking member and the drive bit of the fastening tool, and then hold the screw in the desired orientation while driving the screw.

To achieve improved efficiency in driving the screws, there is a need for a magazine for holding a plurality of screws and feeding successive screws into a position relative to a drive bit for driving the screws using a power fastening tool. There is also a need for collating a plurality of screws.

BRIEF DESCRIPTION OF THE DRAWINGS

For a better understanding of the present invention, together with other objects, features and advantages, reference should be made to the following detailed description which should be read in conjunction with the accompanying figures, wherein.

DETAILED DESCRIPTION

Figure 1:
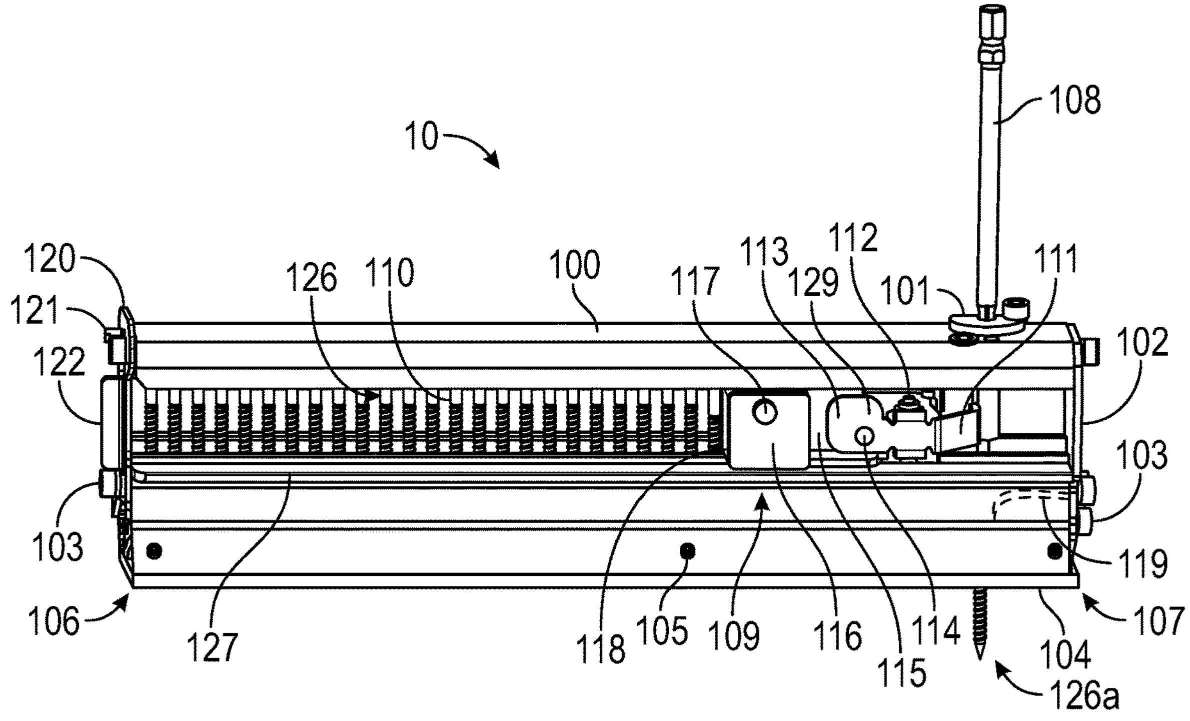
FIG. 1 is a side view of an example screw magazine consistent with the present disclosure.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

For ease of explanation, systems consistent with the present disclosure may be shown and described herein in connection with various example embodiments and screw configurations. It will be recognized, however, a system and method consistent with the present disclosure will be useful in connection with a wide variety of screw configurations including screws having a head configured to receive a drive bit, lag screws, etc. In addition, exemplary embodiments may be described herein in connection with fastening decking members to associated joists. The decking members may be constructed from any type of material including wood, composite materials, concrete, metal, plastic, textiles, and other materials. Also, it is to be understood that a system and method consistent with the present disclosure may be useful in connection with fastening other type of member constructed from any type of material. The exemplary embodiments described herein are thus provided only by way of illustration and are not intended to be limiting.

In some embodiments, a collated screw magazine consistent with the present disclosure may include a magazine body configured to receive a strip of collated screws at a loading end of the magazine body. A pusher coupled to the magazine body is configured to engage at least one screw of the strip of collated screws to urge the at least one screw toward a discharge end of the magazine body opposite from the loading end of the magazine body. A bit opening at the top of the magazine body configured to receive a drive bit for driving the at least one screw through a discharge opening at a bottom of the magazine body. A magazine consistent with the present disclosure may facilitate driving multiple screws into a material while avoiding the cumbersome process of handling one screw at a time. This can improve the speed and efficiency of driving multiple screws, e.g., in constructing a deck or floor.

Systems and methods consistent with the present disclosure may be implemented in a variety of configurations. FIGS. 1-4 illustrate one example of a collated screw magazine 10 consistent with the present disclosure. In general, the magazine 10 includes a magazine body 100 configured to receive a collated strip 110 of screws 126 at a loading end 106 of the magazine body 100 and advance the screws forward toward a discharge end 107 of the magazine body. At the discharge end 107 a forward-most screw **126*a* of the strip 110 of collated screws 126 is positioned in the magazine body 100 in an aligned position with a bit opening (FIG. 4) defined by screw and bit guide 101 at the top of the discharge end 107 of the magazine body 100. A user may insert a driver bit 108, e.g., attached to a power drive device such as impact driver or drill (not shown), into the bit opening 131 of the screw and bit guide 101 into engagement with a head of the forward most screw 126*a*. The driver bit 108 may then be rotated to drive the forwardmost screw 126*a* through a discharge opening 132 at the bottom 133** of the magazine body and into a decking board or other material.

Once the forward most screw **126*a* is driven into the decking board or other material, the magazine body 100 may advance the next screw 126 in the collated strip 110 of screws 126 into the forwardmost position and into alignment with the bit opening 131. This process may continue with respect to all the screws 126 in the collated strip 110 of screws 126. Once all the screws 126 in the collated strip 110 of screws 126 are driven, another collated strip 110 of screws 126 may be loaded into the magazine body 100** for driving into the decking board or other material.

In the illustrated example embodiment, the screws 126 are advanced by a pusher 113 coupled to a carriage assembly 109 slidably mounted on side rail 127 of the magazine body 100. The carriage assembly 109 includes a carrier 115, a compartment 116, a carrier spring 118 spring, and the pusher 113. The carrier 115 is slidably coupled to the side rail 127 for movement between the discharge end 107 and the loading end 106. The compartment 116, the carrier spring 118 and the pusher 113 are coupled to the carrier 115 for slidable movement therewith.

Figure 2:
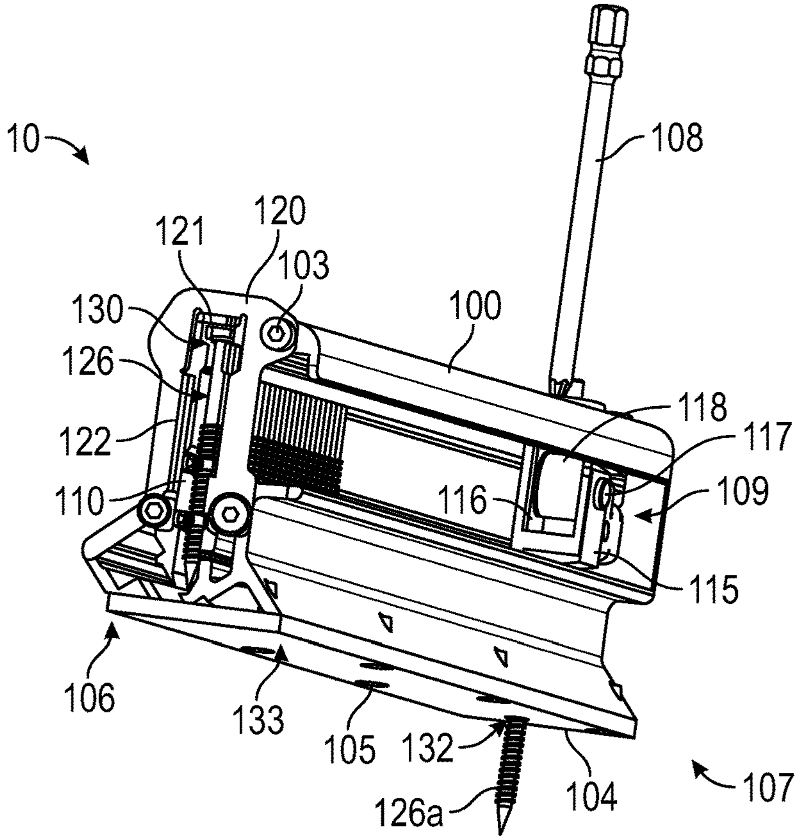
FIG. 2 is a rear perspective view of the screw magazine of FIG. 1.
Figure 3:
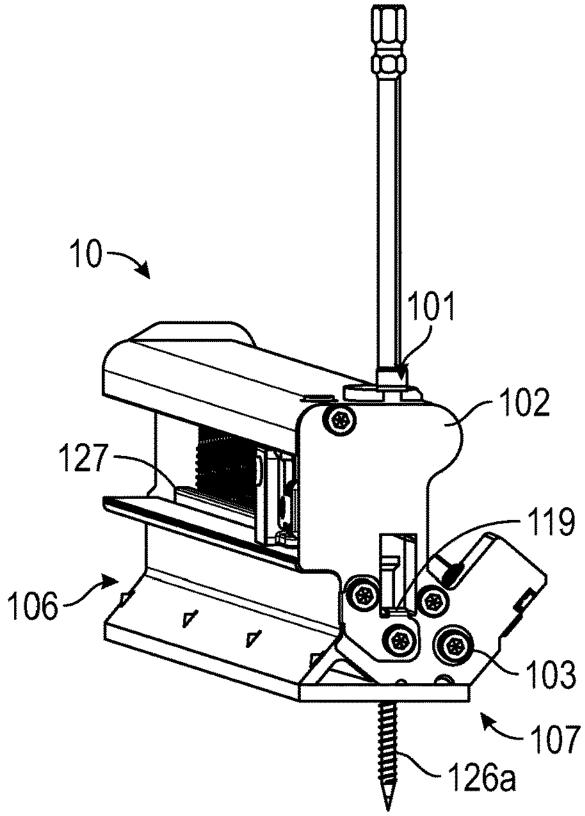
FIG. 3 is a front perspective view of the screw magazine of FIG. 1.
Figure 5:
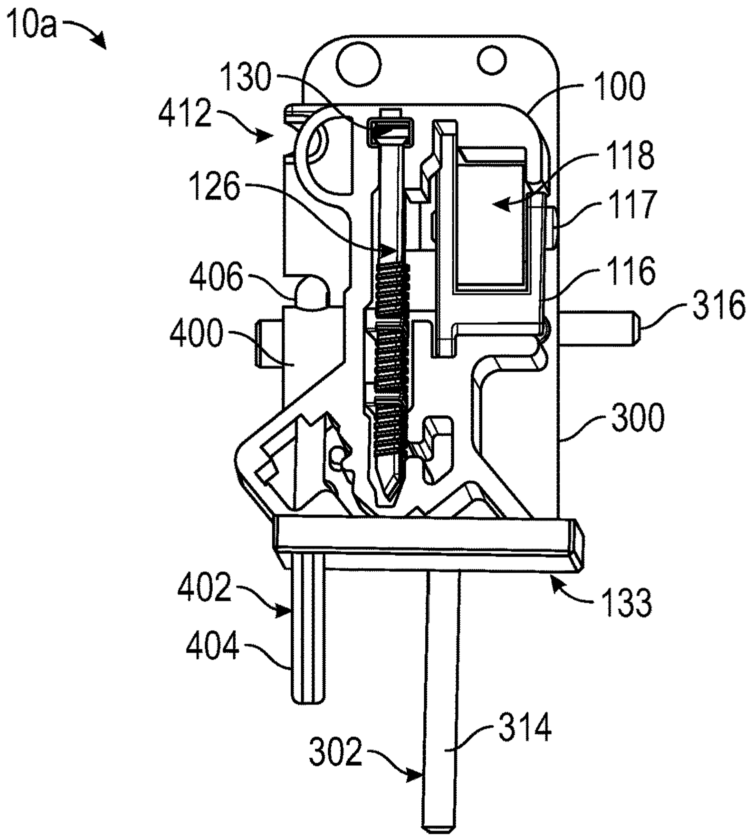
FIG. 5 is an end view of another example screw magazine consistent with the present disclosure with an end plate removed.
Figure 6:
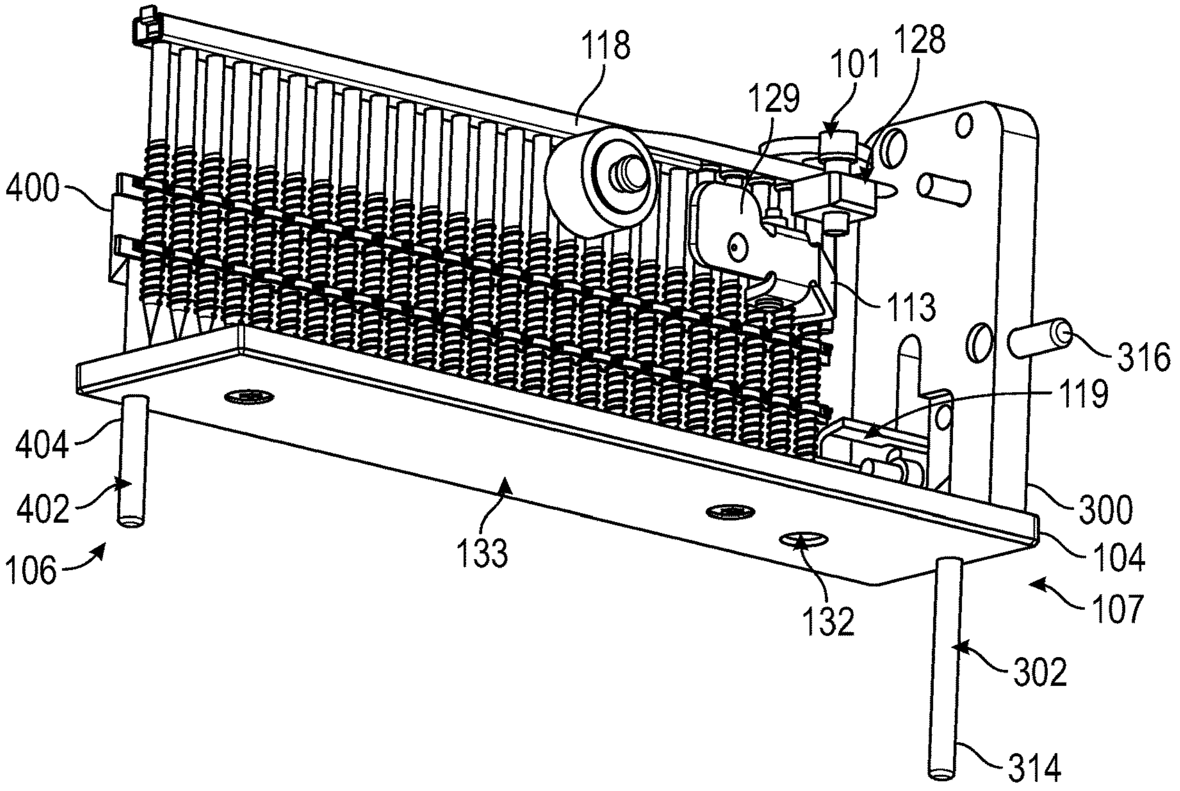
FIG. 6 is a rear perspective view of a portion of the screw magazine of FIG. 5.

As illustrated in FIG. 2 and also in FIG. 5, the compartment 116 is generally u-shaped and the carrier spring 118, which may be constant force spring, is rolled in a coil and disposed in the central portion of the u-shaped compartment 116. One end of the carrier spring 118 is fixed to the compartment 116 using a pin 117. As shown in FIG. 6, an opposite end 128 of the carrier spring is fixed to the discharge end 107 of the magazine body 100. Throughout the travel of the carriage assembly 109 the carrier spring 118 biases the carriage assembly 109 toward the discharge end 107. The carrier spring 118 is configured to retract into the compartment 116 to allow travel of the carriage assembly 109 to the discharge end 107 and is configured to extend to allow the carriage assembly 109 to slide rearward toward the loading end 106, e.g., in response force applied by a user to overcome the spring force of the carrier spring 118.

The pusher 113 includes a pusher head 129 and a pusher tip 111. The pusher 113 is coupled to the carrier 115 by a pivot pin 112 positioned between the pusher head 129 and the pusher tip 111. The pusher head 129 is biased away from the carrier 115 by a pusher head spring 114, e.g., a coil spring, disposed between the pusher head 129 and the carrier 115. The coil spring 114 biases the pusher 113 to pivot around the pivot pin 112 and forces the pusher tip 111 toward the strip 110 of collated screws 126. The pusher tip 111 may extend between any adjacent screws 126 of the strip 110 of collated screws 126. Under the bias force of the carrier spring 118, the pusher tip 111 urges the screws 126 of the strip 110 of collated screws 126 toward the discharge end 107 to position the forwardmost screw **126*a* into alignment with the bit and screw guide 101**.

Figure 7:
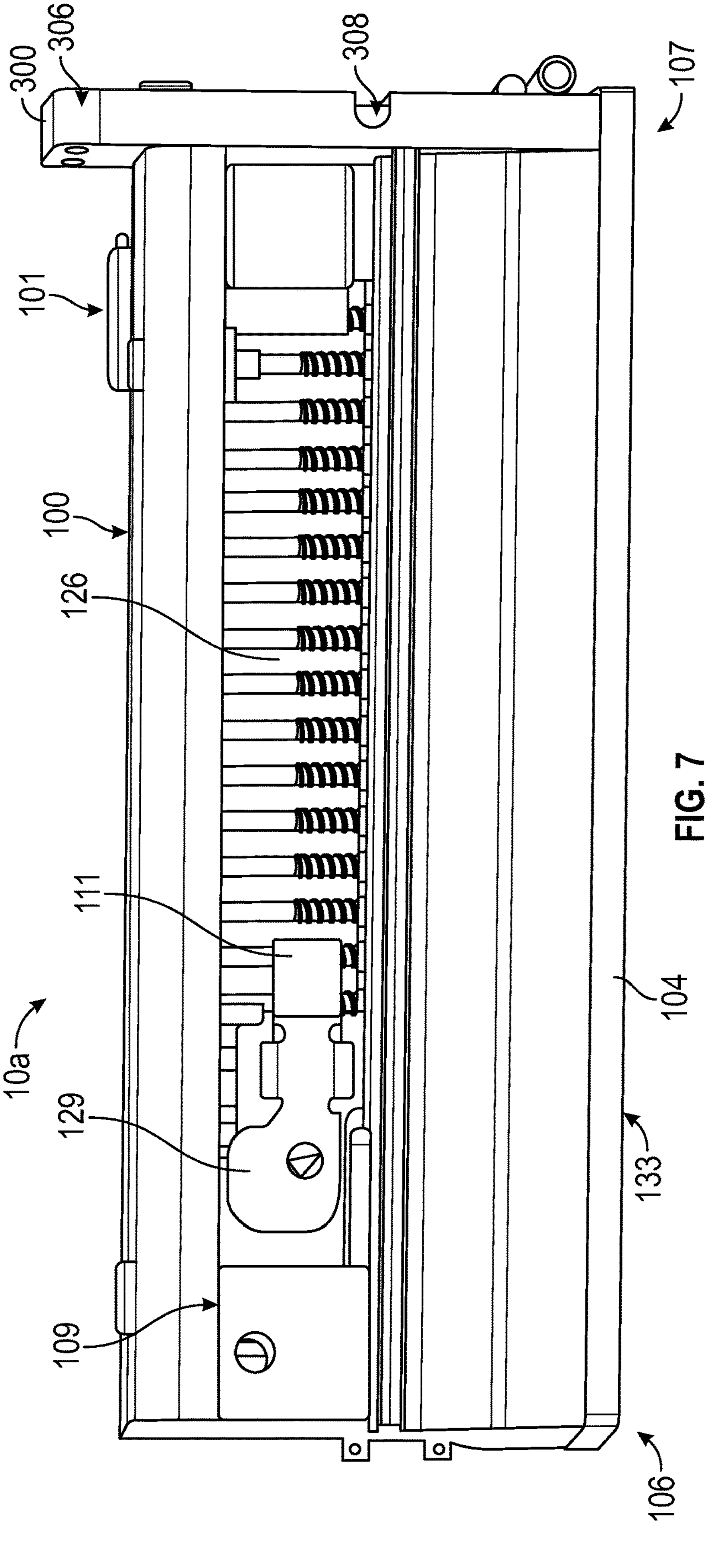
FIG. 7 is a side view of the screw magazine of FIG. 5.

When a new collated strip 110 of screws 126 is loaded into the magazine body 100, the strip 110 may be inserted into the loading end 106 and forced all the way forward to the discharge end 107. A user may depress the pusher head 129 to force the pusher head 129 toward the carrier 115 and rotate the pusher tip 111 away from the strip 110. The user may then force the carriage assembly 109 rearward to the loading end 106 and release the pusher head 129 so that coil spring 114 rotates the pusher 113 about the pin 112 and the pusher tip 111 extends between any adjacent screws 126 of the strip 110, as shown in FIG. 7. The pusher tip 111 then urges the strip 110 of collated screws 126 toward the discharge end 107 under the bias of the carrier spring 118. When the pusher tip 111 reaches the discharge end 107, the user can force the carriage assembly 109 rearward toward the loading end 106 against the bias of the carrier spring 118 to place the pusher tip 111 between adjacent screws 126 to continue pushing the screws 126 of the strip 110 forward.

With particular reference again to FIGS. 1 to 4, in some embodiments the loading end 106 of the magazine body 100 may have an endplate 120 coupled thereto. The endplate 120 may have a screw head stop 121 to position the screws 126 in an interior screw receiving channel 130 defined by the magazine body 100. As shown, the interior screw receiving channel 130 may be substantially linear for receiving a substantially linear strip 110. The endplate 120 may also include a long stop 122. When loading a strip of collated screws 126 the screws 126 may be positioned against the screw head stop 121 and the long stop 122 to align the strip 110 with respect magazine body 100 and guide the strip 100 into the magazine body 100.

Another endplate 102 may be installed at the discharge end 107 of the magazine body. The endplate 102 can include a screw stop locator 119, that locates the screw that is to be driven relative to a drive bit and the screw and bit guide 101. As shown also in FIG. 1, the screw stop locator 119 may extend inward from the end plate 102 to provide a stop for locating the forwardmost screw **126*a* in alignment with the drive bit 108 and the bit opening 131. The endplates 102 and 120 may be held in place by one or more fasteners 103. In some embodiments, the fasteners 103** may be cap screws.

A wear plate 104 may be provided to define at least a portion of the bottom 133 of the magazine body 100 protect the material in contact with the magazine body 100 contact from damage. The wear plate 104 may be held in place with flat head screws 105. The thickness of the wear plate 104 may be selected based on the materials with which the magazine 10 will be used.

Figure 4:
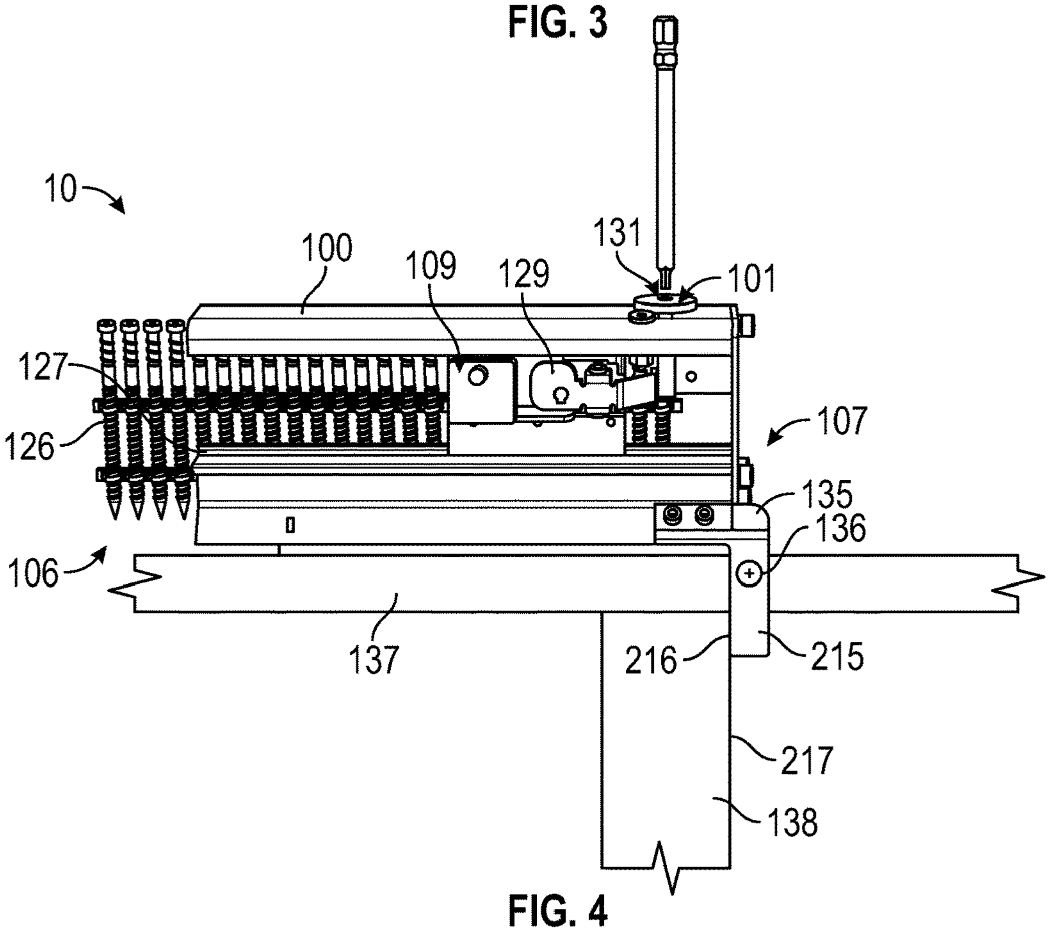
FIG. 4 is a side view of the screw magazine of FIG. 1 positioned relative to joist and deck board.

FIG. 4, shows the collated screw magazine 10 on top of a deck board 137 to be attached to a joist 138 below. As shown, in some embodiments the magazine body 100 may include a substrate stop 135 coupled thereto. The substrate stop 135 may be generally L-shaped with one leg 215 of the L-shape extending outwardly from a side of the magazine body 100 and downward. The substrate stop 135 may be positioned on the magazine body 100 such that when a user positions an interior surface 216 of the substrate stop 135 against a side surface 217 of the joist 138, the magazine 10 is positioned so that a screw 126 driven though the magazine and into the deck board 137 and the joist 138 will be substantially on-center with the joist 138.

In some embodiments, a spacer 136 may be coupled to the magazine body 100 to extend outwardly from a side thereof, e.g., from the side of the substrate stop 135. The distance by which the spacer 136 extends from the side of the magazine body 100 may be selected to establish a desired space between adjacent deck boards. In use, the magazine 10 may be placed on the deck board 137 to be fastened to the joist 138 with the spacer 136 in contact with the adjacent deck board to achieve the desired spacing between adjacent deck boards.

Figure 8:
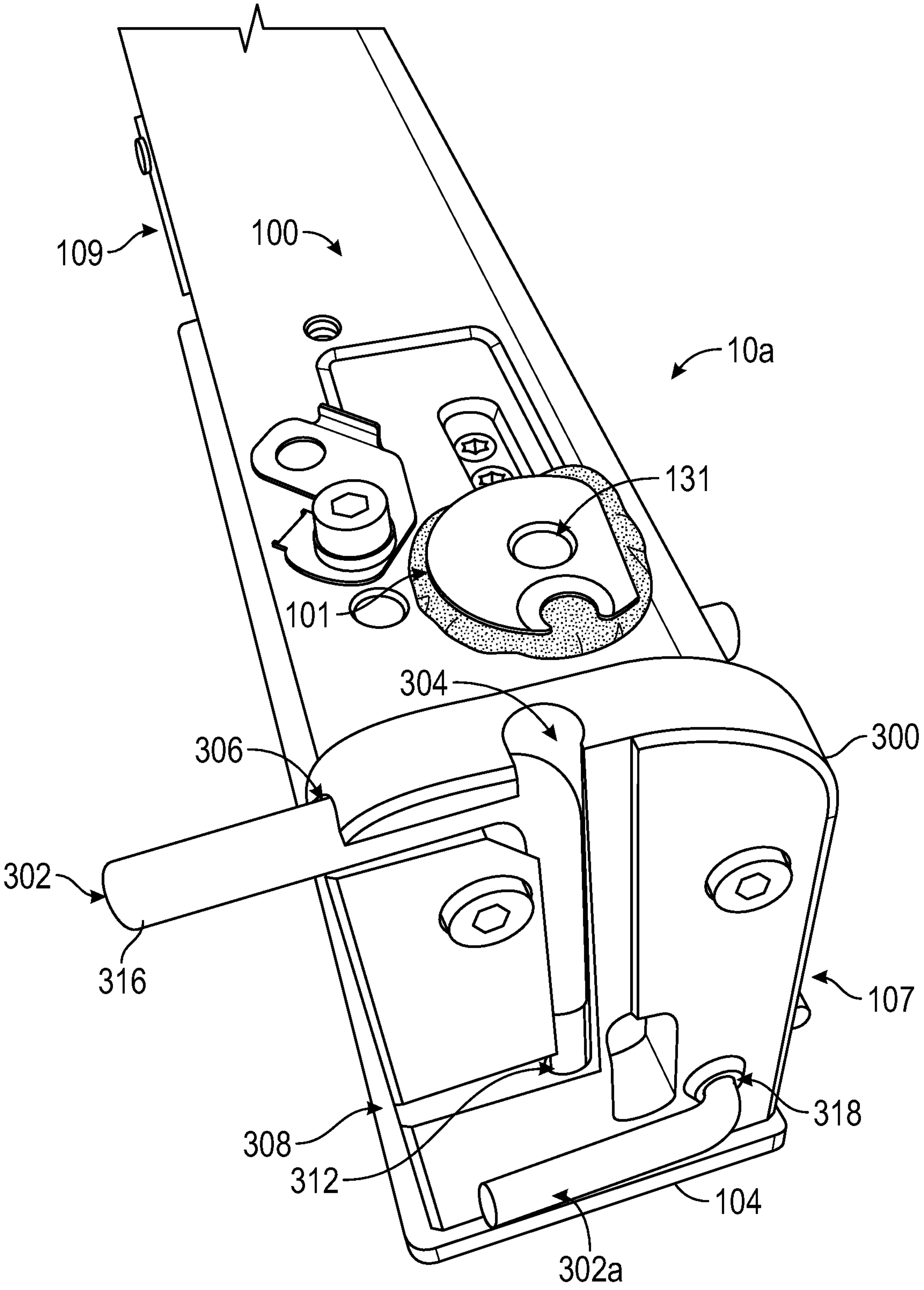
FIG. 8 is a top, front perspective view of the screw magazine of FIG. 5.

FIGS. 5-9 illustrate another embodiment 10*a* of a magazine consistent with the present disclosure including a magazine body 100, as shown in FIGS. 1-4, but including a different front plate 300. With particular reference to FIG. 8, the front plate 300 is coupled to the discharge end 107 of the magazine body 100. The front plate 300 is configured to support a spacer pin 302 configured to act as an abutment stop and/or a spacer for adjacent decking boards.

In the illustrated example, the front plate 302 includes a spacer pin channel 304 defined therein and first 306 and second 308 locking channels defined therein and intersecting the spacer pin channel 304. The first locking channel 306 is substantially horizontal and intersects the spacer pin channel 304 near the top of the plate 300. The second locking channel 308 is substantially horizontal and intersects the spacer pin channel 304 below the first locking channel 306 and closer to the bottom of the plate 300. The spacer pin channel 304 extends substantially vertically from the second locking channel 308 and through the top of the plate 300. The top of the spacer pin channel 304 may be closed by a removable cap 310 to prevent the spacer pin 302 from sliding out of the spacer pin channel 304. A spacer pin bore 312 is formed in the plate 300 in alignment with the spacer pin channel 304 and extends through the bottom of the second locking channel 308, through the bottom of the plate 300 and through any wear plate 104.

The spacer pin 302 is removably attachable to the plate 300 and positionable in a use position and a stored position. In the illustrated example, the spacer pin 302 is generally L-shaped having a long first leg 314 and a shorter second leg 316. The first 314 and/or second 316 legs of the spacer pin 302 may have a round or non-round cross-section. The spacer pin channel 304 is sized to receive the first leg 314 of the spacer pin 302 and the first 306 and second 308 locking channel are sized to receive the second leg 316 of the spacer pin 302.

To install the spacer pin 302 in the plate 300, the first leg 314 of the spacer pin 302 may be positioned in the spacer pin channel 304 with the second leg 316 extending in a forward direction relative to the front plate 300. The first leg 314 of the spacer pin 302 may be moved downward in the spacer pin channel 304 until the second leg 316 is substantially vertically aligned with the first 306 or second 308 locking channel. The spacer pin 302 may then be rotated with the first leg 314 in the spacer pin channel 304 until the second leg 316 is received by the first 306 or second 308 locking channel. In this position, the spacer pin 302 is vertically and removably held in the first 306 or second 308 locking channel.

The first locking channel 306 may be positioned to removably hold the spacer pin 302 in a position where the spacer pin 302 does not extend through the spacer pin bore 312 and out of the bottom 133 of the magazine body, as shown in FIG. 8. This may be a storage position used when the spacer pin 302 is not being used to as an abutment stop and/or a spacer.

When a user desires to use the spacer pin 302, the second leg 316 of the spacer pin 302 may be rotated with the first leg 314 in the spacer pin channel 304 and into the second locking channel 308. When the second leg 316 is in the second locking channel 308 the first leg 314 of the spacer pin 302 extends downwardly from the magazine 10*a*, e.g., as shown in FIGS. 5 and 6. In this use position the spacer pin 302. may function as an abutment stop by contacting a side surface of a joist to set the on-center spacing for the screws 126. In addition, or alternatively, in the use position the spacer pin 302 may function to provide a defined space between adjacent decking boards by positioning adjacent decking boards on either side of the spacer pin 302 before driving a screw using the magazine 10*a*.

The width of the first leg 314 of the spacer pin 302 may be selected for establishing a desired spacing between decking boards and may be between about 1⁄16" and 1". In some embodiments, the first leg 314 of the spacer pin 302 may have a width of 1⁄8", 3⁄16", or 1⁄4". To facilitate storage of multiple common sizes of spacer pins 302, the plate may include one or more storage bores 318 extending into and through the front surface of the plate 300. The first leg 314 of a spacer pin 302*a* may be inserted into a storage bore 318 and into a storage space in the magazine body 100. The second leg 316 of the spacer pin 302*a* may be rotated to rest adjacent the front surface of the plate 300, e.g., as shown in FIGS. 7-9.

Figure 9:
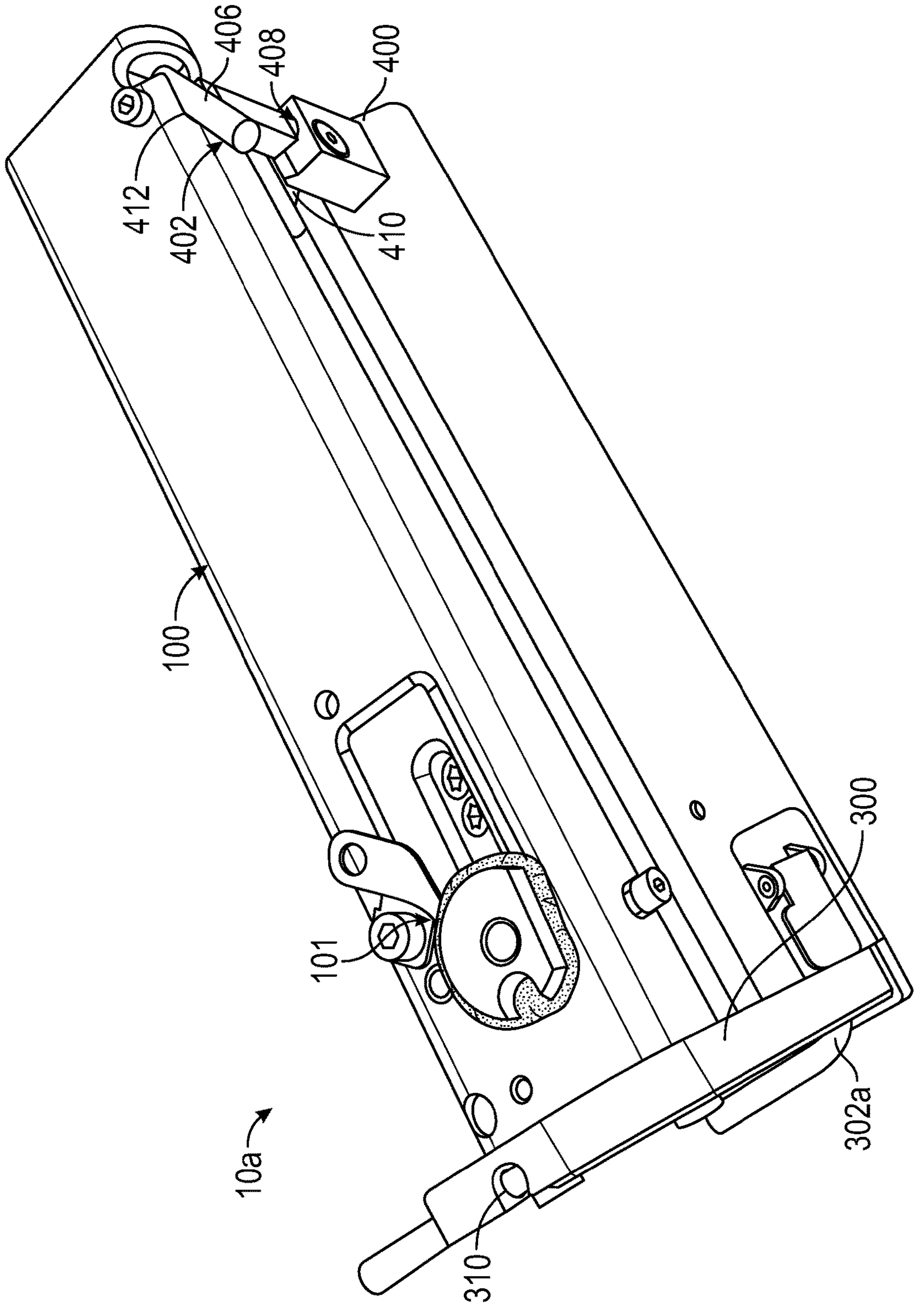
FIG. 9 is a top, side perspective view of the screw magazine of FIG. 5.

With particular reference to FIGS. 5 and 9, in some embodiments a magazine 10*a* consistent with the present disclosure may include a support pin housing 400 for retaining a support pin 402 adjacent the loading end 106 of the magazine 10*a*. The support pin 402 is removably attachable to the support pin housing 400 and positionable in a use position and a stored position. In a use position, the support pin 402 may be configured to extend downwardly from the bottom 133 of the magazine body 100 at an opposite side of the magazine body 100 compared to the spacer pin 302. The support pin 402 may thus contact a first edge of a decking board and the magazine 10*a* may be rotated until a spacer pin 302 in a use position contacts a second, opposing edge of the decking board. The decking board may thus be pinched between the support pin 402 and spacer pin 302 to allow a user to move the decking board into place for fastening.

The support pin 402 may be generally L-shaped with a first leg 404 and a second leg 406. The first 404 and/or second 406 legs of the support pin 402 may have a round or non-round cross-section. In some embodiments the support pin housing 400 may be coupled to a side of the magazine body 100 and may include a support pin bore 408 therethrough that extends through and the magazine body 100 and any wear plate 104.

To place the support pin 402 in a use position, e.g., shown in FIGS. 5 and 6, the first leg 404 of the support pin 402 may be inserted into the support pin bore 408 to extend through the support pin bore 408 and downward beyond the bottom 133 of the magazine body 100. The second leg 406 of the support pin 402 may then be rotated toward the magazine body 100 and inserted into a locking channel 410 (FIG. 6) at the top of the support pin housing 400 to removably hold the support pin.

To place the support pin 402 in a storage position, e.g., as shown in FIG. 9, the second leg 406 of the support pin 402 may be removed from the locking channel 410 and the support pin 402 may be moved upwardly until it is substantially aligned with a second locking channel 412 formed in a the side surface of the magazine body 100. The second leg 406 of the support pin 402 may be rotated toward the magazine body 100 and into the second locking channel 412. In this position the second leg 406 of the support pin 402 is removably held in the second locking channel 412 and the first leg 404 does not extend beyond the bottom 133 of the magazine body 100.

Figure 10:
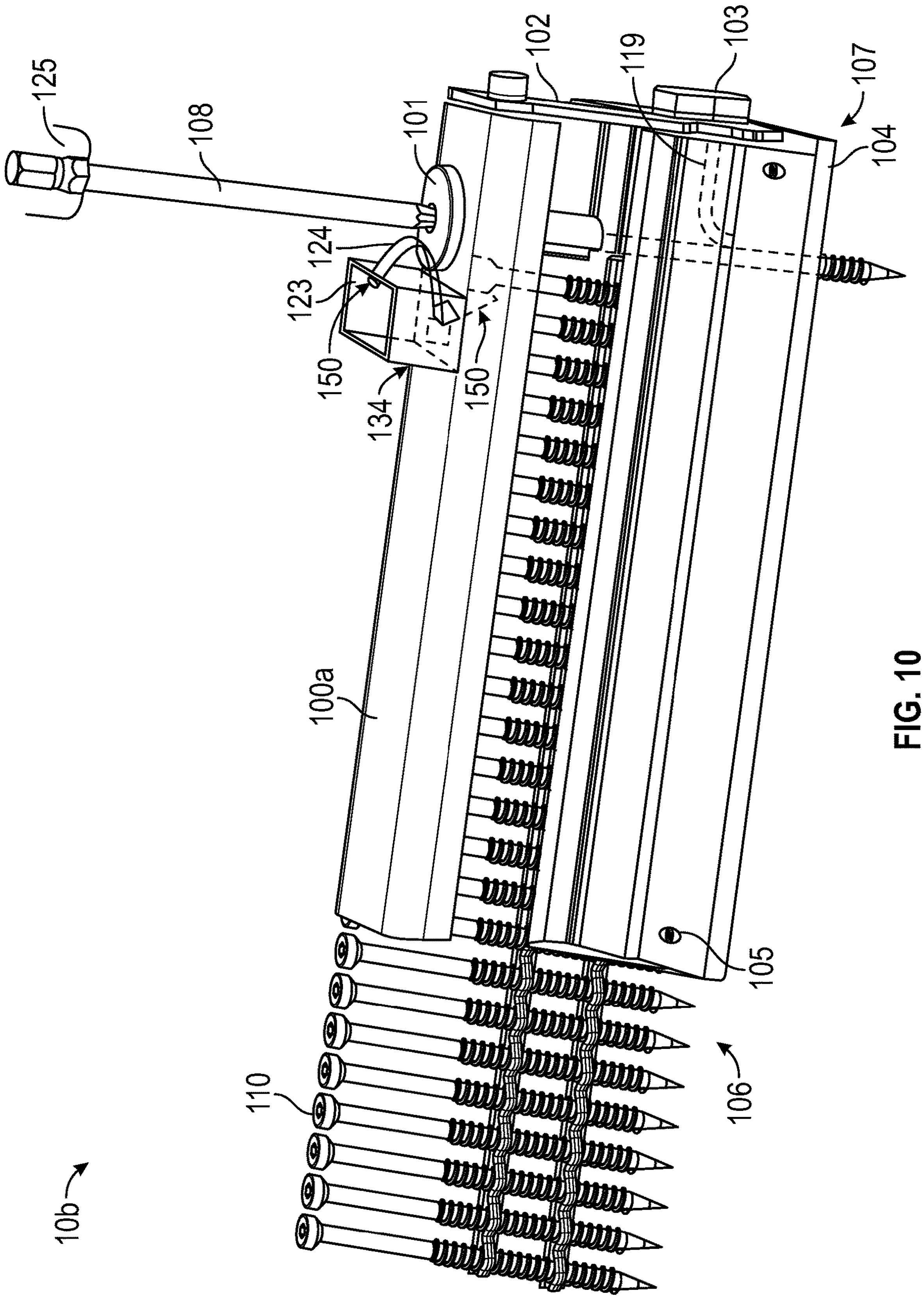
FIG. 10 is a side view of another example screw magazine consistent with the present disclosure.

FIG. 10 illustrates another embodiment of a magazine 10*b* consistent with the present disclosure. In the illustrated example embodiment 100*b*, a top mount feeder 134 is mounted to the top of a magazine body 100*a* for advancing the screws 126 of a collated strip 110 strip of screws 126. The top mount feeder 134 includes a housing 123 and a spring 124, e.g., shaped spring steel, mounted to the housing 123. The spring 124 extends through a slot in the top of the magazine body 100*a* and one end 139 of the spring 124 acts as a pusher and presses against the head of a screw 126 in the collated strip of screws 110 to urge the screw 126 forward toward the discharge end 107.

The spring 124 extends outwardly from the housing 123 toward the drill and bit guide 101 and an opposite end 150 of the spring 124 is fixed to a top portion of the housing 123. As the forwardmost screw 126*a* is driven through the magazine body 100*a*, the chuck 125 of a power fastening tool, e.g., a drill or impact driver, will come in contact with the spring 124. This contact will push the end 139 of the spring 124 feeder back toward the loading end 106 and behind the next screw 126 in the strip 110 and advance the screw 126 forward when the driver 108 is removed from the magazine body 100*a*.

As described above, screws 126 may be provided in a strip 110 and may be fed into the magazine body 100 for driving. Strips 110 of collated screws may also be used without the magazine 10, 10*a*, 10*b* described above. To facilitate use without a magazine, the screws, e.g., screws with a head driven by a bit or lag screws, may be collated and coupled to a rigid support. The rigid support may be configured to be grasped by a single hand of a user without touching a screw the user intends to drive into a material. In this way the rigid support allows the user to position the screw to be driven by grasping the rigid support and moving the rigid strip until the screw is in a desired position and orientation. Thereafter, the other hand of the user can grasp a driver, e.g., a hand-held screwdriver or power fastening device, place a bit or socket of the driver into engagement with the head of the screw, and drive the screw into material while holding the rigid support in one hand and the driver in the other hand.

Collating the screws 126 and coupling them to a rigid support provides several advantages compared to handling loose screws that may need to be individually selected from a container and positioned for driving. For example, collating screws 126 and coupling them to a rigid support for hand-held use with a power driver may prevent injury to a user in case the driver bit slips off the screw head, as fingers are kept away from the driver path. Collating multiple screws 126 in a strip and coupling them to a rigid support also obviates the need to hold a handful of loose screws and may prevent injury to the user from the points of screws when reaching in a bag or box for more loose screws.

Consistent with the present disclosure, a collated strip coupled to a rigid support may use any size screw, e.g., from ½" long to 8" long in some embodiments. In some embodiments, the screws can be 1/16" diameter to 1". Any number of screws may be collated and coupled to the rigid support, depending for example on screw size. The term "rigid" as used herein with reference to a rigid support, means the support is sufficiently rigid to retain the collated screws and allow a user to position a selected screw in a desired position and orientation. The rigid support may be plastic, or non-plastic and round or non-round. The rigid support may be made of all one type of material, or of multiple materials. For example, the rigidity may be provided by one material, while the adhesion and collating can be provided by another material. Collating can be done in one pass, or multiple.

Figure 11:
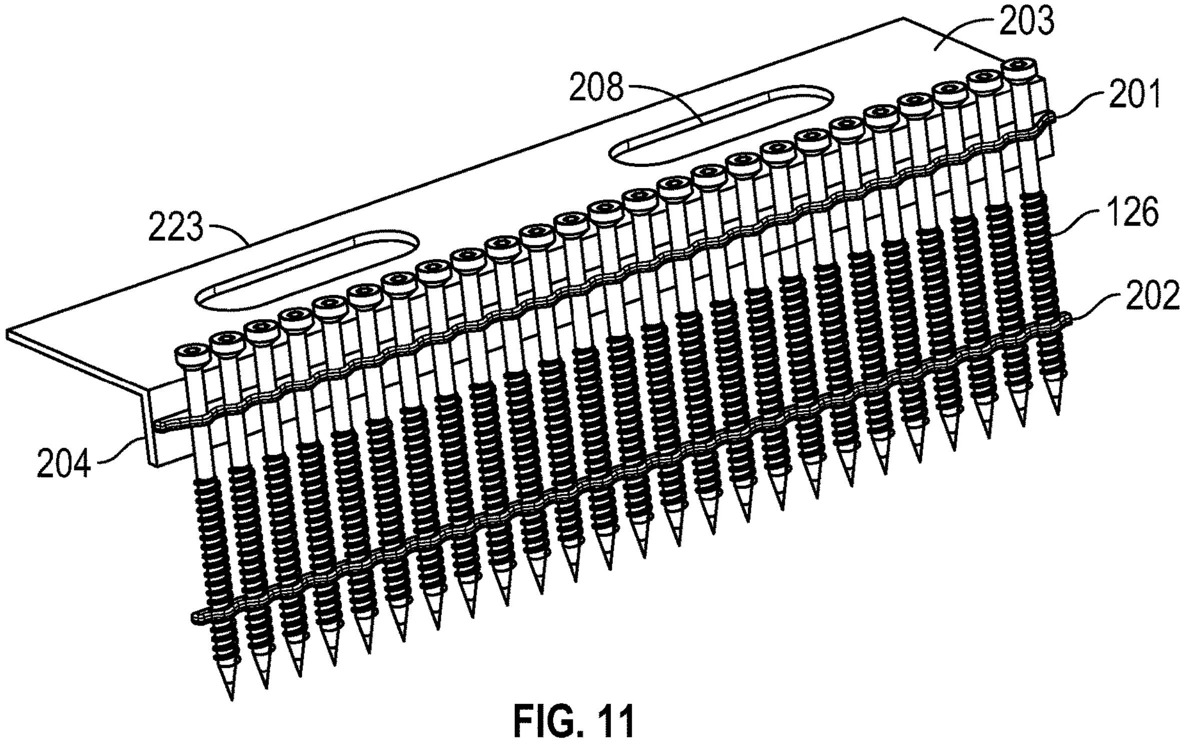
FIG. 11 is a side perspective view of an example of a collated strip of screws consistent with the present disclosure.

FIGS. 11-17 illustrate example embodiments of collated strips 110 of screws 126 coupled to a rigid support with rigidity to be held in one hand, while using a power driver in the other hand. FIG. 11 is a perspective view of shows an L-shaped rigid support 203 having a first leg 223 and a second leg 204 that is shorter than the first leg 223 and extends from an end of the first leg 223. The screws 126 can be collated and adhered to the second leg 204 of the rigid support 203 with a collating strip 201. The collating strip 201 may be continuous, e.g., interconnecting one or more of the screws 126, or discontinuous, e.g., a segment of glue adhering each screw 126 to the second leg 204. The collating strip 201 may be the only collating strip, or a second collating strip 202 can be applied to the screws, e.g., beneath the first collating strip 201. In the illustrated embodiment, the second collating strip 202 does not adhere the screws to the rigid support 203. As shown, the rigid support 203 may have one or more cutouts 208 therein. In use, a user may grasp the first leg 223 of the rigid support 203 with one hand to position a screw 126 in a desired location and orientation and then drive the screw using a power driver held in the other hand.

Figure 12:
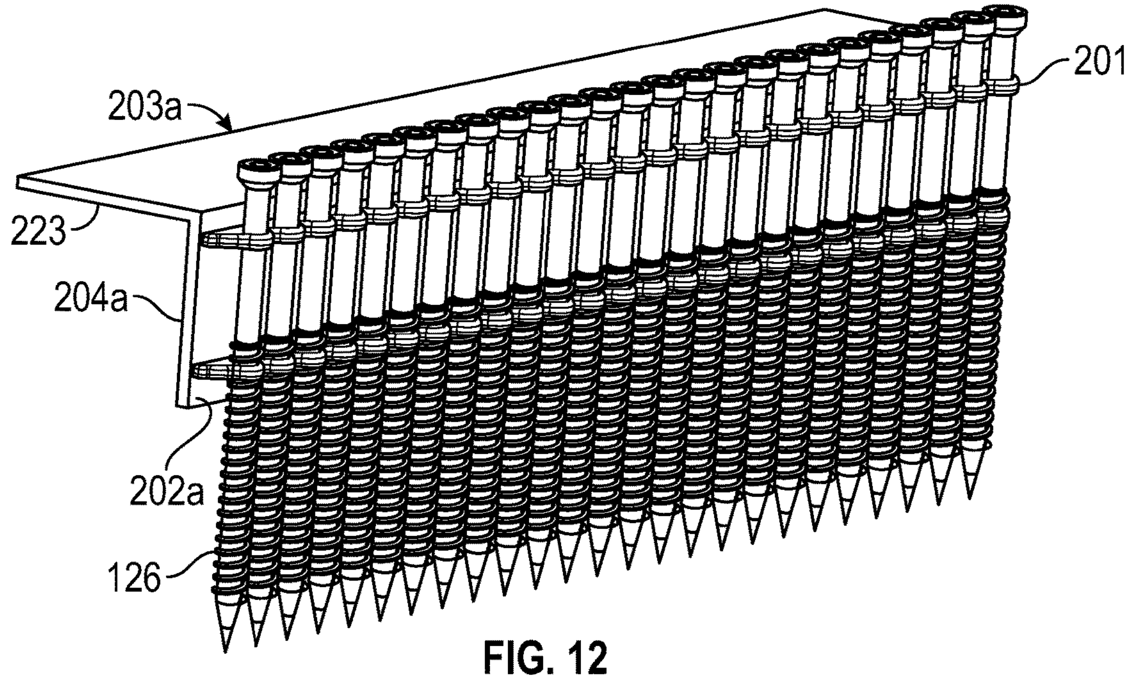
FIG. 12 is a side perspective view of another example of a collated strip of screws consistent with the present disclosure.

FIG. 12 is a perspective view of an L-shaped rigid support 203*a* having a first leg 223 and a second leg 204*a*. A first collating strip 201 collates and adheres the screws 126 to the second leg 204*a* of the rigid support 203*a* and a second collating strip 202*a* positioned beneath the first collating strip 201 also collates and adheres the screws 126 to the second leg 204*a* of the rigid support 203*a*. The second collating strip 202*a* may be continuous, e.g., interconnecting one or more of the screws 126, or discontinuous, e.g., a segment of glue adhering each screw 126 to the second leg 204*a*. In use, a user may grasp the first leg 223 of the rigid support 203*a* with one hand to position a screw 126 in a desired location and orientation and then drive the screw using a power driver held in the other hand.

Figure 13:
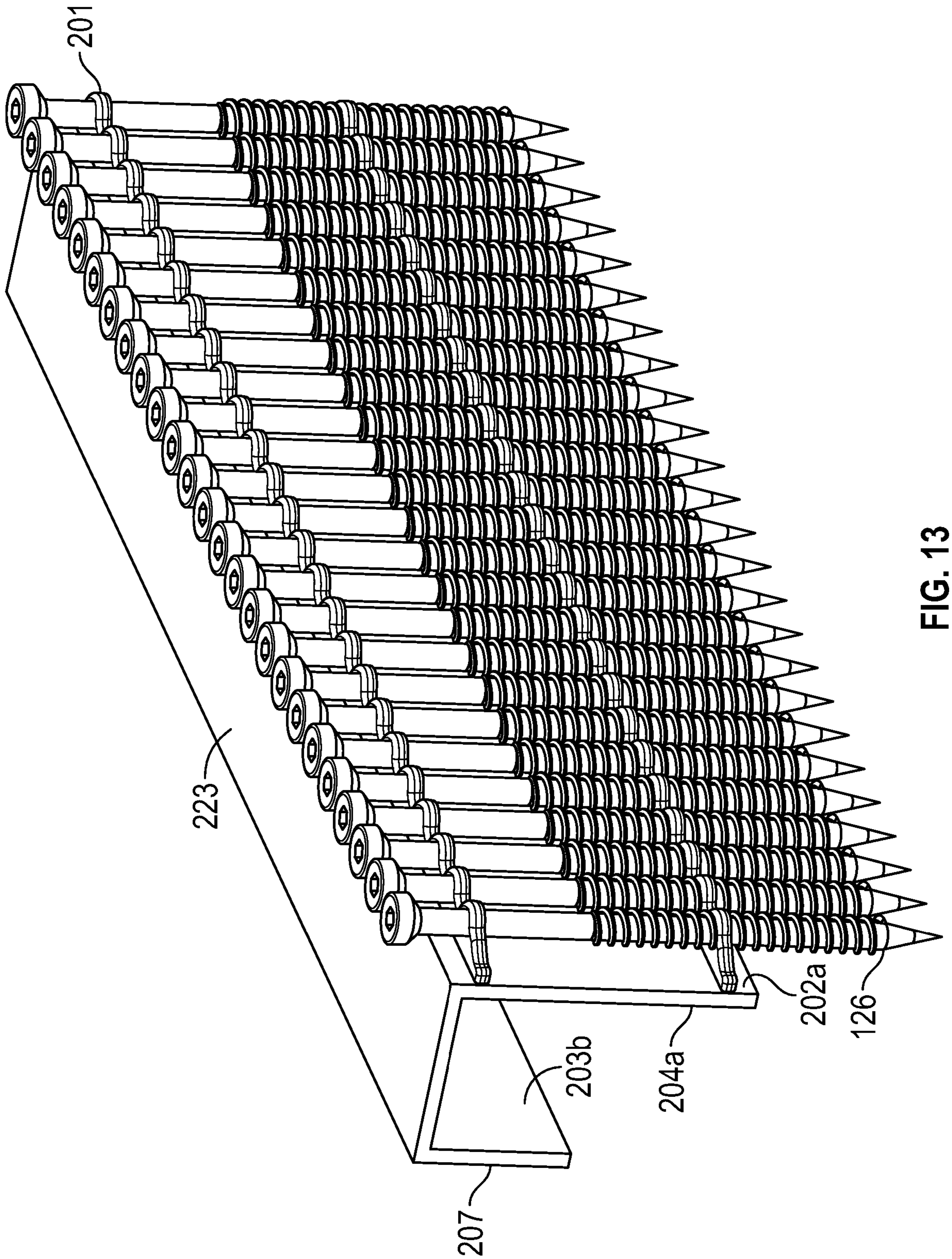
FIG. 13 is a rear perspective view of another example of a collated strip of screws consistent with the present disclosure.

FIG. 13 shows a J-shaped rigid support 203*b* having a first leg 223, a second leg 204*a* extending from a first end of the first leg 223, and a third leg 207 extending from a second end of the first leg 223. A first collating strip 201 collates and adheres the screws 126 to the second leg 204*a* of the rigid support 203*b* and a second collating strip 202*a* positioned beneath the first collating strip 201 also collates and adheres the screws 126 to the second leg 204*a* of the rigid support 203*b*. In use, a user may grasp the first leg 223 and the third leg 207 of the rigid support 203*b* with one hand to position a screw 126 in a desired location and orientation and then drive the screw using a power driver held in the other hand.

Figure 14:
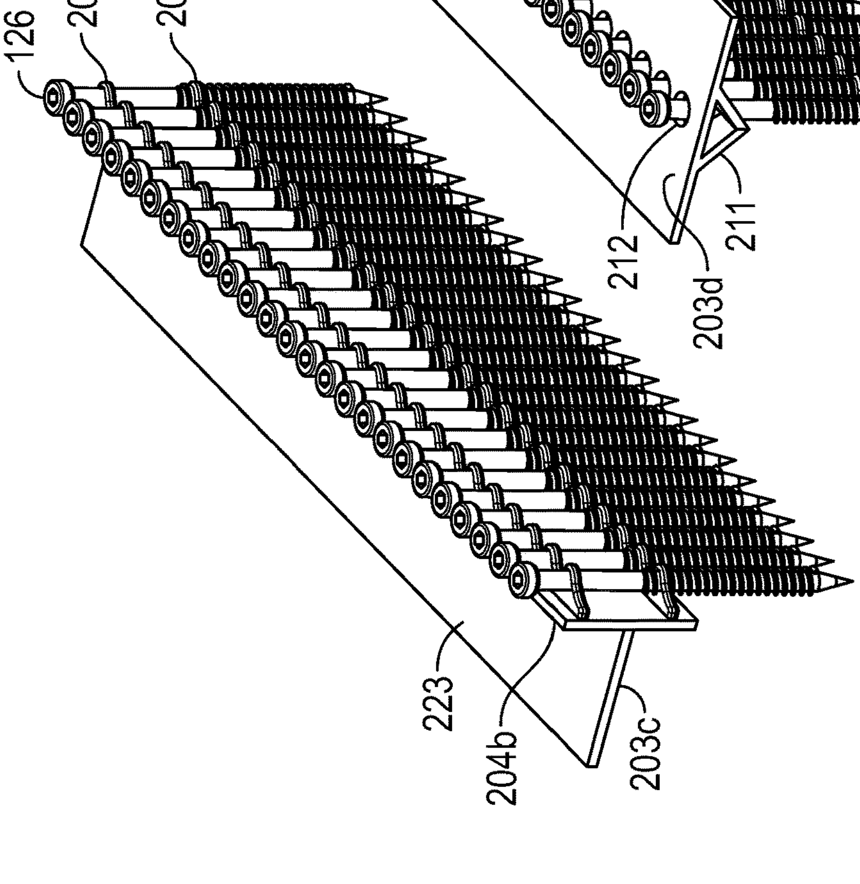
FIG. 14 is a top perspective view of another example of a collated strip of screws consistent with the present disclosure.

FIG. 14 shows a T-shaped rigid support 203*c* having a first leg 223 and a second leg 204*b* at an end of the first leg 223 and extending above and below the first leg 223. A first collating strip 201 collates and adheres the screws 126 to the second leg 204*b* of the rigid support 203*c* and a second collating strip 202*a* positioned beneath the first collating strip 201 also collates and adheres the screws 126 to the second leg 204*b* of the rigid support 203*c*. In use, a user may grasp the first leg 223 of the rigid support 203*c* with one hand to position a screw 126 in a desired location and orientation and then drive the screw using a power driver held in the other hand.

Figure 15:
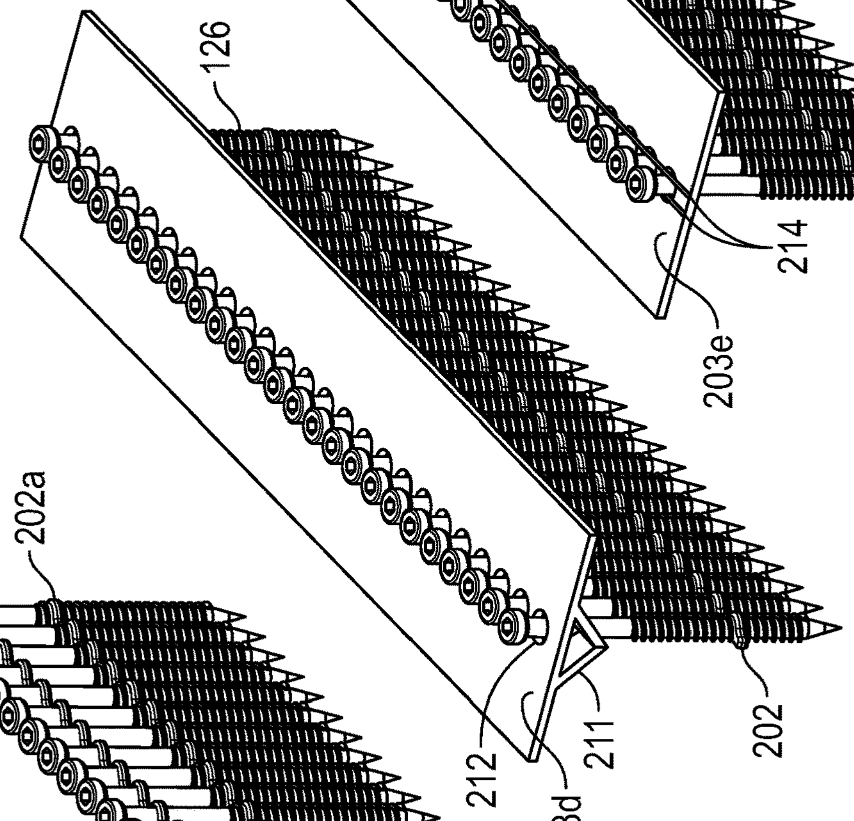
FIG. 15 is a top perspective view of another example of a collated strip of screws consistent with the present disclosure.

FIG. 15 shows a flat rigid support 203*d* having shanks of the screws 126 and a collating strip 202 positioned beneath the flat rigid support 203*d* and the heads of the screws 126 positioned above the rigid support 203*d*. The rigid support 203*d* has clearance holes 212 sized so the heads of the screws 126 can pass through the clearance holes 212 when driven. The rigid support 203*d* may have a spacer 211, e.g., in the form of a divide V-shape, extending downward from a bottom of the rigid support 203*d* and between each of the screws 126 to provide spacing between the screws 126. In use, a user may grasp the either or both sides of the of the rigid support 203*d* with one hand to position a screw 126 in a desired location and orientation and then drive the screw using a power driver held in the other hand.

Figure 16:
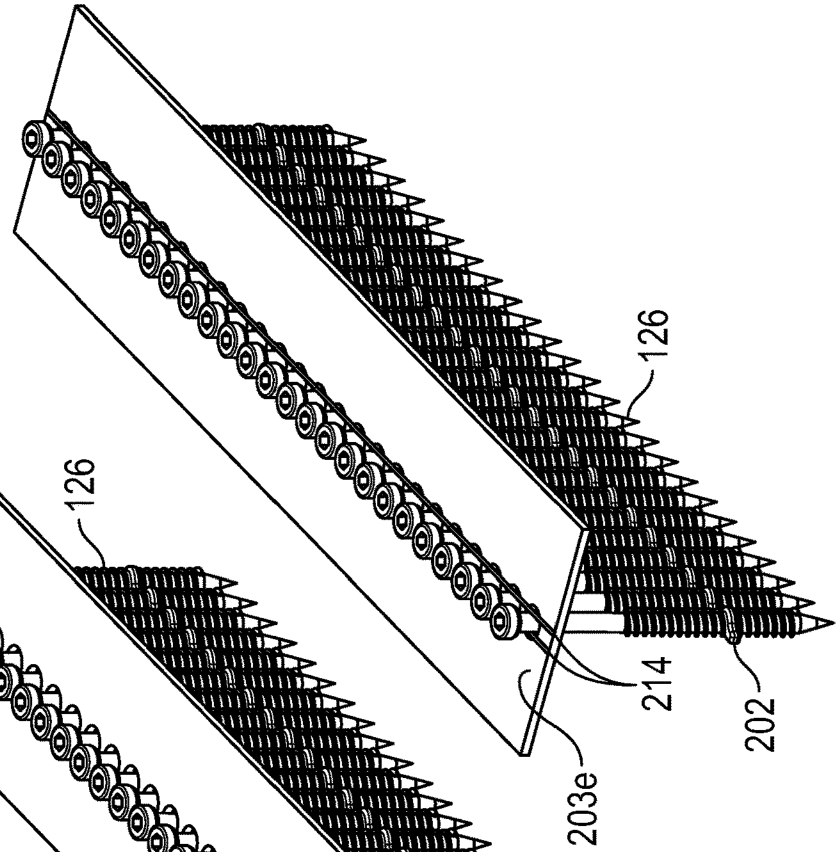
FIG. 16 is a top perspective view of another example of a collated strip of screws consistent with the present disclosure.

FIG. 16 shows a flat rigid support 203*e* having shanks of the screws 126 and a collating strip 202 beneath the flat rigid support 203*e* and the heads of the screws 126 positioned above the rigid support 203*c*. The flat rigid support 203*e* and the collating strip 202 can be respectively located at the top and bottom of the screws 126, as shown, or vice-versa. In the illustrated example, the flat rigid support 203*e* has an adhesive strip 214 on each side of the screws 126, which may be applied in one pass. In use, a user may grasp the either or both sides of the of the rigid support 203*e* with one hand to position a screw 126 in a desired location and orientation and then drive the screw using a power driver held in the other hand.

Figure 17:
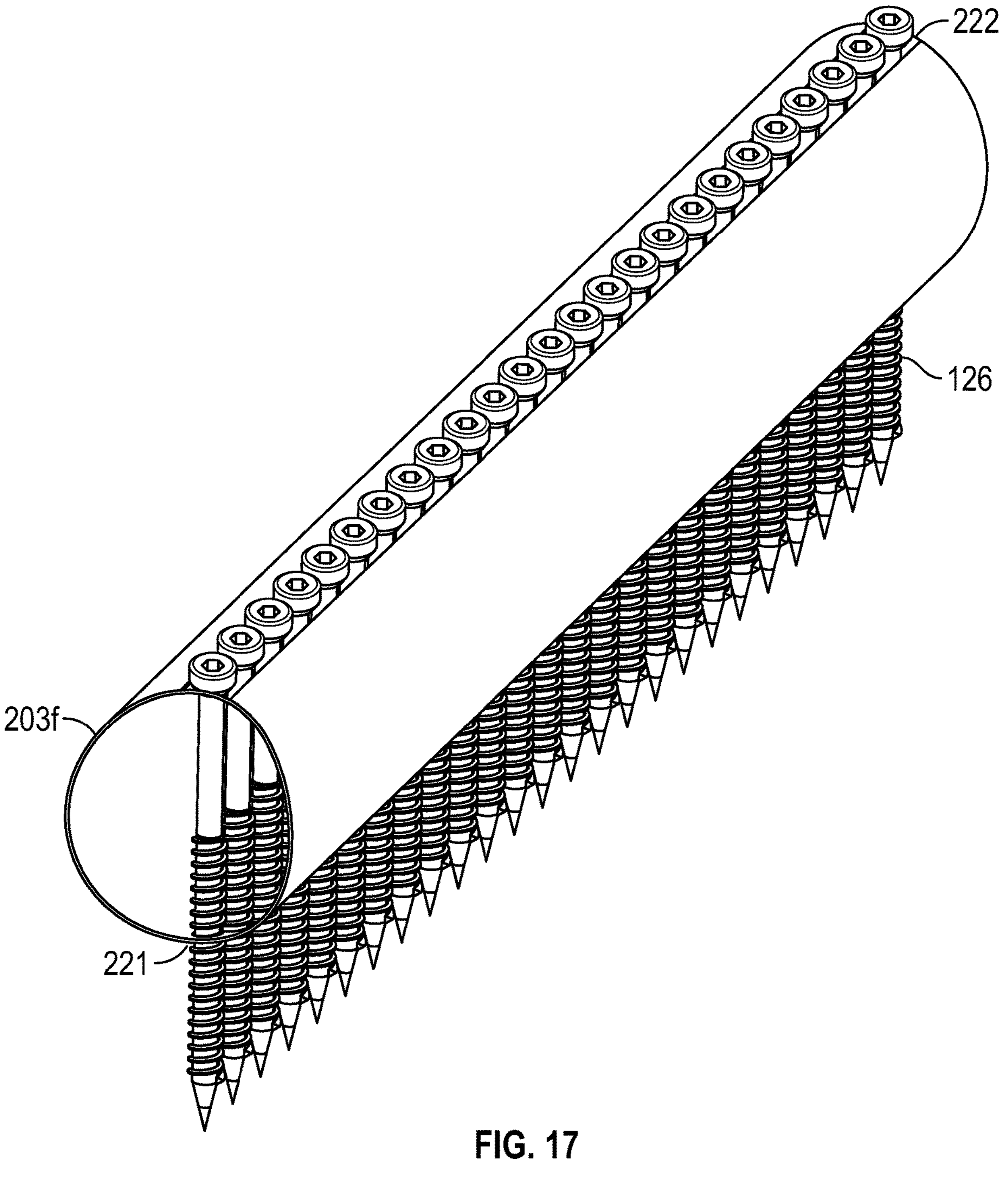
FIG. 17 is a top perspective view of another example of a collated strip of screws consistent with the present disclosure.

FIG. 17, shows a cylindrical rigid support 203*f*. This rigid support 203*d* can be made of plastic or other material and can hold heads of the screws 126 at the top 222 of the rigid support and the shanks of the screws 126 at the bottom 221 of the support 203*d*. In use, a user may wrap one hand around the rigid support 203*f* with one hand to position a screw 126 in a desired location and orientation and then drive the screw using a power driver held in the other hand.

According to one aspect of the disclosure there is thus provided a collated screw magazine including: a magazine body configured to receive a strip of collated screws at a loading end of the magazine body; a pusher coupled to the magazine body, the pusher being configured to engage at least one screw of the strip of collated screws to urge the at least one screw toward a discharge end of the magazine body opposite from the loading end of the magazine body; and a bit opening at a top of the magazine body configured to receive a drive bit for driving the at least one screw through a discharge opening at a bottom of the magazine body.

According to another aspect of the disclosure, there is provided a collated screw magazine including: a magazine body configured to receive a strip of collated screws at a loading end of the magazine body; a carriage assembly slidably disposed on the magazine body. The carriage includes: a carrier, a carrier spring coupled to the carrier and configured to bias the carrier toward a discharge end of the magazine body opposite from the loading end of the magazine body, and a pusher comprising a pusher head and a pusher tip, the pusher being pivotally coupled to the carrier at a pivot point between the pusher head and the pusher tip, the pusher tip being configured to engage at least one screw of the strip of collated screws to urge the at least one screw toward the discharge end of the magazine body. The magazine also includes a bit opening at a top of the magazine body configured to receive a drive bit for driving the at least one screw through a discharge opening at a bottom of the magazine body.

According to another aspect of the disclosure there is provided a collated strip of screws including a rigid support; a plurality of screws; and at least one collating strip configured to adhere the plurality of screws to the rigid support in a collated configuration.

According to another aspect of the disclosure there is provided a collated strip of screws including: a cylindrical rigid support; and a plurality of screws, heads of the plurality of screws being support at a top of the cylindrical rigid support and shanks of the plurality of screws being supported at a bottom of the cylindrical rigid support.

According to another aspect of the disclosure there is provided a method of driving a screw into material, the method including: grasping, using a first hand, a rigid support to which a plurality of screws are supported in a collated configuration; positioning at least one of the plurality of screws in desired location with respect to the material by moving the rigid support with the single hand; grasping, using a second hand, a driver; positioning a bit of the driver to engage the at least one screw using the second hand; and driving the at least one screw into the material using the second hand.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize or be able to ascertain using no more than routine experimentation, many equivalents to the specific embodiments of the invention described herein.

It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The term "coupled" as used herein refers to any connection, coupling, link. Components described herein as "coupled" may be directly coupled to one another or may be indirectly coupled through intermediate components.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

The terms “comprising”, “including” and “having” are intended to be inclusive and mean that there may be additional elements other than the listed elements.

The indefinite articles “a” and “an,” as used herein in the specification and in the claims, unless clearly indicated to the contrary, should be understood to mean “at least one.”

The phrase “and/or,” as used herein in the specification and in the claims, should be understood to mean “either or both” of the elements so conjoined, i.e., elements that are conjunctively present in some cases and disjunctively present in other cases. Other elements may optionally be present other than the elements specifically identified by the “and/or” clause, whether related or unrelated to those elements specifically identified, unless clearly indicated to the contrary.

Spatially relative terms, such as “beneath,” below,” upper,” “lower,” “above” and the like may be used herein for ease of description to describe one element or feature’s relationship to another element(s) or feature(s) as illustrated in the drawings. These spatially relative terms are intended to encompass different orientations of the device in use or operation in addition to the orientation shown in the drawings. For example, if the device in the drawings is turned over, elements described as “below” or “beneath” other elements or features would then be oriented “above” the other elements or features. Thus, the exemplary term “below” can encompass both an orientation of above and below. The device may be otherwise oriented (rotated 90 degrees or at other orientations) and the spatially relative descriptors used herein interpreted accordingly.

What is claimed is:

1. A collated screw magazine comprising:

a magazine body configured to receive a strip of collated screws at a loading end of the magazine body;

a carriage assembly slidably disposed on the magazine body, the carriage assembly including:

a carrier, a carrier spring coupled to the carrier and configured to bias the carrier toward a discharge end of the magazine body opposite from the loading end of the magazine body, and a pusher comprising a pusher head and a pusher tip, the pusher being pivotally coupled to the carrier at a pivot point between the pusher head and the pusher tip, the pusher tip being configured to engage at least one screw of the strip of collated screws to urge the at least one screw toward the discharge end of the magazine body; and a bit opening at a top of the magazine body configured to receive a drive bit for driving the at least one screw through a discharge opening at a bottom of the magazine body.

2. A collated screw magazine according to claim 1, the carriage assembly further comprising a pusher head spring disposed between the pusher head and the carrier for biasing the pusher tip toward the strip of collated screws.

3. A collated screw magazine according to claim 1 further comprising an abutment stop coupled to the discharge end of the magazine body and configured to extend downward below a bottom of the magazine body.

4. A collated screw magazine according to claim 3 further comprising a spacer pin extending outwardly from a side surface of the abutment stop.

5. A collated screw magazine according to claim 1, the collated screw magazine further comprising a front plate coupled to the discharge end of the magazine body, the front plate being configured to support a spacer pin in a use position wherein the spacer pin extends beyond a bottom of the magazine body.

6. A collated screw magazine according to claim 5, wherein the front plate comprises a spacer pin channel formed therein for receiving the spacer pin.

7. A collated screw magazine according to claim 6, wherein the spacer pin has first and second legs and the spacer pin channel is configured to receive the first leg of the spacer pin, and wherein the front plate further comprises a first locking channel configured to receive the second leg of the spacer pin for releasably holding the spacer pin the use position.

8. A collated screw magazine according to claim 7, wherein the front plate further comprises a second locking channel configured to receive the second leg of the spacer pin for releasably holding the spacer pin a storage position wherein the spacer pin does not extend beyond the bottom of the magazine body.

9. A collated screw magazine according to claim 5 further comprising a support pin disposed at the loading end of the body, the support pin being positionable in a use position wherein the support pin extends beyond a bottom of the magazine body.

10. A collated screw magazine according to claim 9, further comprising a support pin housing coupled to the loading end of the magazine body, the support pin housing being configured to support the support pin the use position.

11. A collated screw magazine according to claim 10, wherein the support pin has first and second legs and the support pin housing comprises a support pin bore for receiving the first leg of the support pin and a first locking channel configured to receive the second leg of the support pin for releasably holding the support pin the use position.

12. A collated screw magazine according to claim 1, wherein the magazine body defines an interior screw receiving channel configured to receive the strip of collated screws;

the carrier spring is disposed between and the carriage assembly and the discharge end of the magazine body;

the pusher tip engages the at least one screw by the pusher being rotated about the pivot point to force the pusher tip into contact with the at least one screw;

the collated screw magazine includes surfaces at the top of the magazine body defining the bit opening wherein the bit opening is sized to receive the drive bit; and each of the screws of the strip of collated screws comprises a head configured to receive the drive bit, whereby the drive bit can drive the at least one screw through the discharge opening.

13. A collated screw magazine comprising:

a magazine body configured to receive a strip of collated screws at a loading end of the magazine body;

a pusher coupled to the magazine body, the pusher being configured to engage at least one screw of the strip of collated screws to urge the at least one screw toward a discharge end of the magazine body opposite from the loading end of the magazine body;

a bit opening at a top of the magazine body configured to receive a drive bit for driving the at least one screw through a discharge opening at a bottom of the magazine body; and a front plate coupled to discharge end of the magazine body, the front plate being configured to support a spacer pin in a use position wherein the spacer pin extends beyond a bottom of the magazine body.

14. A collated screw magazine according to claim 13, wherein the front plate comprises a spacer pin channel formed therein for receiving the spacer pin.

15. A collated screw magazine according to claim 14, wherein the spacer pin has first and second legs and the spacer pin channel is configured to receive the first leg of the spacer pin, and wherein the front plate further comprises a first locking channel configured to receive the second leg of the spacer pin for releasably holding the spacer pin the use position.

16. A collated screw magazine according to claim 15, wherein the front plate further comprises a second locking channel configured to receive the second leg of the spacer pin for releasably holding the spacer pin a storage position wherein the spacer pin does not extend beyond the bottom of the magazine body.

17. A collated screw magazine according to claim 13 further comprising a support pin disposed at the loading end of the body, the support pin being positionably in a use position wherein the support pin extends beyond a bottom of the magazine body.

18. A collated screw magazine according to claim 17 further comprising a support pin housing coupled to the loading end of the magazine body, the support pin housing being configured to support the support pin the use position.

19. A collated screw magazine according to claim 18, wherein the support pin has first and second legs and the support pin housing comprising a support pin bore for receiving the first leg of the support pin and a first locking channel configured to receive the second leg of the support pin for releasably holding the support pin the use position.

20. A collated screw magazine according to claim 19, wherein the magazine body comprises a second locking channel formed therein for releasably holding the support pin a storage position wherein the support pin does not extend beyond the bottom of the magazine body.

21. A collated screw magazine according to claim 13, wherein the magazine body defines an interior screw receiving channel configured to receive the strip of collated screws;

wherein the pusher is biased toward the discharge end and is positioned to engage the at least one screw to bias the at least one screw toward the discharge end;

the collated screw magazine includes surfaces at the top of the magazine body defining the bit opening wherein the bit opening is sized to receive the drive bit; and each of the screws of the strip of collated screws comprises a head configured to receive the drive bit, whereby the drive bit can drive the at least one screw through the discharge opening.

22. A collated screw magazine comprising:

a magazine body configured to receive a strip of collated screws at a loading end of the magazine body, the magazine body comprising a housing coupled to a top of the magazine body;

a pusher coupled to the magazine body, the pusher being configured to engage at least one screw of the strip of collated screws to urge the at least one screw toward a discharge end of the magazine body opposite from the loading end of the magazine body; and a bit opening at a top of the magazine body configured to receive a drive bit for driving the at least one screw through a discharge opening at a bottom of the magazine body, wherein the pusher comprises a spring having a first end configured to engage the at least one screw and a second end coupled to the housing, the spring extending outward from the housing and positioned to engage a chuck of power driver for driving the drive bit, whereby engagement of the chuck with the spring forces the first end of the spring toward the loading end of the magazine to engage another one of the collated screws to urge the other one of the collated screws toward the discharge end.

23. A collated screw magazine according to claim 22, wherein the magazine body defines an interior screw receiving channel configured to receive the strip of collated screws;

wherein the pusher is biased toward the discharge end and is positioned to engage the at least one screw to bias the at least one screw toward the discharge end;

the collated screw magazine includes surfaces at the top of the magazine body defining the bit opening wherein the bit opening is sized to receive the drive bit; and each of the screws of the strip of collated screws comprises a head configured to receive the drive bit, whereby the drive bit can drive the at least one screw through the discharge opening.

* * * * *